US009020297B2

(12) United States Patent
Chehaiber

(10) Patent No.: US 9,020,297 B2
(45) Date of Patent: Apr. 28, 2015

(54) METHOD AND DEVICE FOR PARALLEL PROCESSING OF IMAGES

(75) Inventor: Moatasem Chehaiber, Rodovre (DK)

(73) Assignee: Ivisys APS, Kopenhamn (DK)

( * ) Notice: Subject to any disclaimer, the term of this patent is extended or adjusted under 35 U.S.C. 154(b) by 144 days.

(21) Appl. No.: 13/990,284

(22) PCT Filed: Dec. 15, 2011

(86) PCT No.: PCT/DK2011/050486
§ 371 (c)(1),
(2), (4) Date: May 29, 2013

(87) PCT Pub. No.: WO2012/079587
PCT Pub. Date: Jun. 21, 2012

(65) Prior Publication Data
US 2013/0251265 A1    Sep. 26, 2013

Related U.S. Application Data

(60) Provisional application No. 61/429,263, filed on Jan. 3, 2011.

(30) Foreign Application Priority Data

Dec. 17, 2010    (DK) .................................. 2010 70557

(51) Int. Cl.
*G06K 9/64*    (2006.01)
*G06K 9/46*    (2006.01)
(Continued)

(52) U.S. Cl.
CPC ............... *G06K 9/4671* (2013.01); *G06T 5/20* (2013.01); *G06K 9/00973* (2013.01); *G06T 5/002* (2013.01); *G06T 2207/20016* (2013.01); *G06T 2207/20224* (2013.01)

(58) Field of Classification Search
None
See application file for complete search history.

(56) References Cited

U.S. PATENT DOCUMENTS 5,359,674 A * 10/1994 van der Wal .................. 382/261
5,963,675 A * 10/1999 van der Wal et al. ......... 382/260
(Continued)

FOREIGN PATENT DOCUMENTS

EP    2138978 A    12/2009
WO    9739422 A    10/1997
(Continued)

OTHER PUBLICATIONS

Bandyopadhyay, S. et al., "Efficient Prototype Reordering in Nearest Neighbor Classification," Pattern Recognition, vol. 35, No. 12, Dec. 2002, pp. 2791-2799.
(Continued)

*Primary Examiner* — Jayesh A Patel
*Assistant Examiner* — Mai Tran
(74) *Attorney, Agent, or Firm* — Remarck Law Group PLC

(57) ABSTRACT

The present invention relates to the parallel calculation of convoluted data. In particular, the invention relates to Gaussian pyramid construction and parallel processing of image data, such as parallel calculation of repeatedly convoluted data for use in a SIFT algorithm. This is achieved by providing a method for obtaining a plurality of difference images from an original image defined by a plurality of pixels, said method comprising: Providing a plurality of blurring convolution functions, each of said blurring functions providing increasing degree of blurring of an original image upon convolution of said original image; establishing a plurality of difference convolution functions, Dif, by calculating the difference between two of said blurring convolution functions, each of said two blurring convolution functions providing different degrees of blurring of an original image upon convolution of said original image; and calculating a plurality of difference images from said original image, by convolving each of said difference convolution functions, Dif, with said original image to obtain difference images.

10 Claims, 12 Drawing Sheets

Block diagram for calculating DoG function

(51) Int. Cl.
*G06T 5/20* (2006.01)
*G06K 9/00* (2006.01)
*G06T 5/00* (2006.01)

(56) References Cited

U.S. PATENT DOCUMENTS

| | | | |
|---|---|---|---|
| 6,049,859 | A | 4/2000 | Gliese et al. |
| 6,647,150 | B2 * | 11/2003 | van der Wal ................ 382/260 |
| 6,711,293 | B1 * | 3/2004 | Lowe ............................ 382/219 |
| 2005/0265633 | A1 | 12/2005 | Piacentino et al. |
| 2007/0003152 | A1 | 1/2007 | Hoppe et al. |
| 2010/0067745 | A1 | 3/2010 | Kovtun et al. |
| 2010/0169576 | A1 * | 7/2010 | Chen ............................ 711/122 |

FOREIGN PATENT DOCUMENTS

| | | | |
|---|---|---|---|
| WO | 2004055724 A | | 7/2004 |
| WO | 2006083277 A | | 8/2006 |
| WO | WO 2006083277 A2 * | | 8/2006 |

OTHER PUBLICATIONS

Bohm, C. et al., "Efficient Similarity Search in Digital Libraries," Advances in Digital Libraries 2000, Proceedings IEEE, Washington D.C., May 22-24, 2000, pp. 193-199.

Feng, H. et al., "Parallelization and Characterization of SIFT on Multi-Core Systems," Workload Characterization, IEEE International Symposium, Sep. 14, 2008, pp. 14-23.

Greenspan, M. et al., "Acceleration of Binning Nearest Neighbour Methods," Proceedings of Vision Interface 2000, May 14, 2000, pp. 337-344.

International Search Report dated Jun. 19, 2012 for PCT International Application No. PCT/DK2011/050486, 4 pages.

International Search Report dated Mar. 22, 2012 for PCT International Application No. PCT/DK2011/050487, 3 pages.

Liao, S. et al., "High Dimensional Similarity Search With Space Filling Curves," Proceedings 17th International Conference on Data Engineering, Heidelberg, Germany, Apr. 2-6, 2001, pp. 615-622.

Park, J. et al., "An Efficient Memory System for the SIMD Construction of a Gaussian Pyramid," IEEE Transactions on Parallel and Distributed Systems, IEEE Service Center, Los Alamitos, CA, vol. 7, No. 8, Aug. 1, 1996, pp. 855-860.

Popkin, T. et al., Accurate and Efficient Method for Smoothly Space-Variant Gaussian Blurring,. IEEE Transactions on Image Processing, May 2010, vol. 19, No. (5), pp. 1362-1370.

Ruiz, V., "An algorithm for finding nearest neighbours in (approximately) constant average time," Pattern Recognition Letters 4, Jul. 1986, pp. 145-157.

Warn, S. et al., "Accelerating SIFT on Parallel Architectures," Cluster Computing and Workshops, 2009, Cluster '09 IEEE International Conference, Aug. 31, 2009, pp. 1-4.

Ye, L. et al., "Autocannibalistic and Anyspace Indexing Algorithms with Applications to Sensor Data Mining," Dept. of Computer Science & Eng., University of California, Riverside, 2009, pp. 85-96.

\* cited by examiner

METHOD AND DEVICE FOR PARALLEL PROCESSING OF IMAGES

CROSS-REFERENCE TO RELATED APPLICATIONS

This application is a 371 U.S. National Stage of International Application No. PCT/DK2011/050486, filed Dec. 15, 2011, which claims priority to U.S. Provisional Application Ser. No. 61/429,263, filed Jan. 3, 2011 and Danish Application Serial No. PA 201070557, filed Dec. 17, 2010. The disclosure of each of the above applications is incorporated herein by reference in their entirety.

The present invention relates to the parallel calculation of convoluted data. In particular, the invention relates to computation efficient Gaussian pyramid construction suitable for parallel processing of image data, such as parallel calculation of repeatedly convoluted data for use in a SIFT algorithm.

TECHNICAL BACKGROUND

The conventional SIFT algorithm, inter alia disclosed in the U.S. Pat. No. 6,711,293 B1, discloses a method and apparatus for identifying scale invariant features in an image, and the use of these features for locating an object in an image.

The US patent application 2010/0169576 discloses a method for implementing a scale invariant feature transform algorithm, wherein a difference of Gaussian image may be obtained from convolving an input image with a difference of Gaussian filter. While the application purports that the processes may be conducted in parallel, the application is silent about actual parallel implementations.

SUMMARY OF THE INVENTION

The conventional SIFT algorithm was designed as a serial algorithm suitable for implementation using sequential processors. In order to increase the speed of the conventional SIFT algorithm, it may be contemplated to perform the algorithm as a parallel process. However, the conventional SIFT algorithm comprises a number of steps, wherein the result of a step is a prerequisite for calculating the subsequent. Hence, the conventional SIFT algorithm does not readily render itself suitable for parallel processing.

The inventor of the present invention has surprisingly discovered that certain steps of the conventional SIFT algorithm may be reformulated to allow parallel processing. Furthermore, the inventor has found that such a reformulation allows the method to be incorporated in hardware, thereby allowing a tremendous increase of the calculation speed as compared to known software implemented algorithms.

According to an aspect, the present invention concerns a method for obtaining a difference image for use in a method of identifying scale invariant features in an image defined by a plurality of pixels, the method comprising: Calculating a difference convolution function, Dif, by calculating the difference between two different blurring convolution functions, each of said two different blurring convolution functions providing different degrees of blurring of an original image upon convolution of said original image; and convolving said difference convolution function, Dif, with an original image to obtain a difference image. The difference convolution function is preferably only calculated one time and may subsequently be used repeatedly for different images.

According to an aspect, the present invention concerns a method for obtaining a plurality of difference images for use in a method of identifying scale invariant features in an image defined by a plurality of pixels, the method comprising: Providing a plurality of blurring convolution functions, each of said blurring functions providing increasing degree of blurring of an original image upon convolution of said original image; and calculating a plurality of difference images from an original image. The blurring convolution functions are preferably only calculated one time and may subsequently be used repeatedly for different images. Upon using Gaussian blurring functions, it is sufficient to add the widths of the functions to obtain the width of a function, obtained by convolving the functions.

According to an aspect, the invention concerns a method for obtaining a plurality of difference images from an original image defined by a plurality of pixels, said method comprising:
  a. Providing a plurality of blurring convolution functions, each of said blurring functions providing increasing degree of blurring of an original image upon convolution of said original image;
  b. Establishing a plurality of difference convolution functions, Dif, by calculating the difference between two of said blurring convolution functions, each of said two blurring convolution functions providing different degrees of blurring of an original image upon convolution of said original image; and
  c. Calculating a plurality of difference images from said original image, by convolving each of said difference convolution functions, Dif, with said original image to obtain difference images.

According to an aspect, the invention concerns a method for obtaining a first plurality of difference images and at least one subsequent plurality of difference images, said method comprising:
  a. Obtaining the first plurality of difference images according to the invention, from an original image, using a plurality of blurring convolution functions;
  b. Convolving said plurality of blurring functions with a down sampling function and an anti-aliasing function to obtain a down sampling anti-aliasing convolution function, DAcon;
  c. Convolving said down sampling anti-aliasing convolution function, DAcon, with the original image to obtain a subsequent image;
  d. Obtaining a subsequent plurality of difference images according to the invention from the subsequent image; and
  e. Optionally using the subsequent image as the original image, and repeating steps c and d for obtaining additional subsequent pluralities of difference images.

According to an aspect, the invention concerns a method for obtaining a first plurality of difference images and at least one subsequent plurality of difference images, said method comprising:
  a. Obtaining the first plurality of difference images according to the invention, from an original image, using a plurality of blurring convolution functions;
  b. Down sampling the blurred, original image, to obtain a first image.
  c. Convolving said plurality of blurring functions with an anti-aliasing function to obtain a down sampling anti-aliasing convolution function, Acon;
  d. Convolving the obtained anti-aliasing convolution function, Acon, with the first image to obtain a subsequent image;
  e. Obtaining a subsequent plurality of difference images according to the invention from the subsequent image; and f. Optionally denoting the subsequent image the original image, and repeating steps b, c and d for obtaining additional subsequent pluralities of difference images.

According to an aspect, the invention concerns a method for obtaining a first plurality of difference images and a number, n, of subsequent plurality of difference images, said method comprising:
  a. Obtaining said first plurality of difference images according to the invention, from an original image, using a plurality of blurring convolution functions;
  b. Obtaining a first down sampling anti-aliasing convolution function, DAcon(1), by convolving said plurality of blurring functions with a down sampling function and an anti-aliasing function;
  c. When n is larger than 1, obtaining additional down sampling anti-aliasing convolution function(s), DAcon(t), by convolving the previous down sampling anti-aliasing convolution function, DAcon(t−1), with said plurality of blurring functions, a down sampling function and an anti-aliasing function, beginning this step c with t=2, and repeating this step while increasing t with unitary increments until t reaches n;
  d. Convolving all of the down sampling anti-aliasing convolution functions, DAcon, with said original image to obtain an image(x) for each down sampling anti-aliasing convolution function DAcon(x);
  e. Obtaining the n subsequent pluralities of difference images, according to the invention, obtaining each plurality(x) from each image(x).

According to an aspect, the invention concerns a method for identifying image features which are stable across different scales in an image defined by a plurality of pixels, wherein multiple filtering steps and re-sampling steps may be performed in parallel, the method comprising:
  a. Obtaining multiple difference images according to the invention;
  b. Locating pixel amplitude extrema in said multiple difference images;
  c. Producing a pixel gradient vector for each pixel in each difference image;
  d. Associating vector orientations with respective actual maximal and minimal amplitude pixels associated with each difference image.

According to an aspect, the invention concerns an image processing device for obtaining a plurality of difference images from an original image defined by a plurality of pixels, said device comprising means for receiving data in respect of said first image, means for transmitting or storing said difference images, and processing means, configured to: Calculate a plurality of difference images from an original image, by convolving each of a plurality of difference convolution functions, Dif, with said original image to obtain difference images; wherein said plurality of difference convolution functions, Dif, have been established by calculating the difference between two blurring convolution functions, each of said two blurring convolution functions providing different degrees of blurring of said original image upon convolution of said original image.

According to an aspect, the invention concerns an image processing device for identifying scale invariant features in an image defined by a plurality of pixels, said image processing device comprising a processor circuit configured to: Implement a method of the invention.

According to an aspect, the invention concerns a software program for obtaining a plurality of difference images from an original image defined by a plurality of pixels, said software program causing a plurality of processors to: Calculate a plurality of difference images from an original image, by convolving each of a plurality of difference convolution functions, Dif, with said original image to obtain difference images, such that said plurality of processors calculates different difference images in parallel; wherein said plurality of difference convolution functions, Dif, have been established by calculating the difference between two blurring convolution functions, each of said two blurring convolution functions providing different degrees of blurring of said original image upon convolution of said original image.

According to an aspect, the invention concerns a software program for identifying scale invariant features in an image defined by a plurality of pixels, said software program configured to: Implement a method of the invention.

DETAILED DISCLOSURE

Additional aspects and embodiments are provided below.

According to an embodiment, the invention concerns a method for obtaining a plurality of difference images from an original image defined by a plurality of pixels, said method comprising:
  a. Providing a plurality of blurring convolution functions, each of said blurring functions providing increasing degree of blurring of an original image upon convolution of said original image;
  b. Establishing a plurality of difference convolution functions, Dif, by calculating the difference between two of said blurring convolution functions, each of said two blurring convolution functions providing different degrees of blurring of an original image upon convolution of said original image; and
  c. Calculating a plurality of difference images from said original image, by convolving each of said difference convolution functions, Dif, with said original image to obtain difference images.

A particular advantage of this method is that it is easily adaptable for parallel processing.

According to an embodiment, the invention concerns a method, wherein said plurality of difference images is computed in parallel.

According to an embodiment, the invention concerns a method according to the invention, for use in a method of identifying scale invariant features in said original image.

According to an embodiment, the invention concerns a method according to the invention, wherein said plurality of difference blurring convolution functions are established once and repeatedly used for subsequent calculation of said difference images. The blurring convolution functions and/or difference convolution functions are preferably only calculated one time and may subsequently be used repeatedly for different images. The convolution functions may be implemented in hardware, such as in a single chip.

According to an embodiment, the invention concerns a method according to the invention, wherein said blurring convolution functions are Gaussian. Upon using Gaussian blurring convolution functions, it is sufficient to add the widths of the functions to obtain the width of the function, obtainable by convolving the functions.

According to an embodiment, the invention concerns a method according to the invention, wherein said difference convolution function, Dif, is approximated by a polynomial.

According to an embodiment, the invention concerns a method for obtaining a first plurality of difference images and at least one subsequent plurality of difference images, said method comprising:

a. Obtaining the first plurality of difference images according to the invention, from an original image, using a plurality of blurring convolution functions;
b. Convolving said plurality of blurring functions with a down sampling function and an anti-aliasing function to obtain a down sampling anti-aliasing convolution function, DAcon;
c. Convolving said down sampling anti-aliasing convolution function, DAcon, with the original image to obtain a subsequent image;
d. Obtaining a subsequent plurality of difference images according to the invention from the subsequent image; and
e. Optionally using the subsequent image as the original image, and repeating steps c and d for obtaining additional subsequent pluralities of difference images.

Step b can be conducted once, and may be part of the hardware implementation. Instead of step e, more subsequent pluralities of difference images may be calculated directly from the original image by combining more blurring, down sampling and anti-aliasing convolution functions.

According to an embodiment, the invention concerns a method of the invention, wherein subsequent pluralities of difference images are calculated directly from the original image by convolving with additional blurring, down sampling and anti-aliasing convolution functions.

According to an embodiment, the invention concerns a method for obtaining a first plurality of difference images and at least one subsequent plurality of difference images, said method comprising:
a. Obtaining the first plurality of difference images according to the invention, from an original image, using a plurality of blurring convolution functions;
b. Down sampling the blurred, original image, to obtain a first image.
c. Convolving said plurality of blurring functions with an anti-aliasing function to obtain a down sampling anti-aliasing convolution function, Acon;
d. Convolving the obtained anti-aliasing convolution function, Acon, with the first image to obtain a subsequent image;
e. Obtaining a subsequent plurality of difference images according to the invention from the subsequent image; and
f. Optionally denoting the subsequent image the original image, and repeating steps b, c and d for obtaining additional subsequent pluralities of difference images.

According to an embodiment, the invention concerns a method for obtaining a first plurality of difference images and a number, n, of subsequent plurality of difference images, said method comprising:
a. Obtaining said first plurality of difference images according to the invention, from an original image, using a plurality of blurring convolution functions;
b. Obtaining a first down sampling anti-aliasing convolution function, DAcon(1), by convolving said plurality of blurring functions with a down sampling function and an anti-aliasing function;
c. When n is larger than 1, obtaining additional down sampling anti-aliasing convolution function(s), DAcon(t), by convolving the previous down sampling anti-aliasing convolution function, DAcon(t−1), with said plurality of blurring functions, a down sampling function and an anti-aliasing function, beginning this step c with t=2, and repeating this step while increasing t with unitary increments until t reaches n;
d. Convolving all of the down sampling anti-aliasing convolution functions, DAcon, with said original image to obtain an image(x) for each down sampling anti-aliasing convolution function DAcon(x);
e. Obtaining the n subsequent pluralities of difference images, according to the invention, obtaining each plurality(x) from each image(x).

The parameters t and x are here dummy parameters introduced to distinguish the functions, pluralities and images. According to a further embodiment, steps b and c needs only be done once and may be hardware implemented.

According to an embodiment, the invention concerns a method for identifying image features which are stable across different scales in an image defined by a plurality of pixels, wherein multiple filtering steps and re-sampling steps may be performed in parallel, the method comprising:
a. Obtaining multiple difference images according to the invention;
b. Locating pixel amplitude extrema in said multiple difference images;
c. Producing a pixel gradient vector for each pixel in each difference image;
d. Associating vector orientations with respective actual maximal and minimal amplitude pixels associated with each difference image.

According to an embodiment, the invention concerns a method, wherein the multiple filtering steps are Gaussian filtering steps.

According to an embodiment, the invention concerns an image processing device for obtaining a plurality of difference images from an original image defined by a plurality of pixels, said device comprising means for receiving data in respect of said first image, means for transmitting or storing said difference images, and processing means, configured to: Calculate a plurality of difference images from an original image, by convolving each of a plurality of difference convolution functions, Dif, with said original image to obtain difference images; wherein said plurality of difference convolution functions, Dif, have been established by calculating the difference between two blurring convolution functions, each of said two blurring convolution functions providing different degrees of blurring of said original image upon convolution of said original image.

According to an embodiment, the invention concerns an image processing device for identifying scale invariant features in an image defined by a plurality of pixels, said image processing device comprising a processor circuit configured to: Implement a method according to the invention.

According to an embodiment, the invention concerns an image processing device, wherein said processor circuit comprises a chip, such as a CPU.

According to an embodiment, the invention concerns an image processing device, said image processing device comprising multiple chips, each chip configured to calculate at least one difference image. This allows parallel calculation of difference images.

According to an embodiment, the invention concerns an image processing device, wherein said image processing device comprises a bilinear interpolator, said bilinear interpolator comprising a multiply and accumulate unit (MAC), a delay line adder and a control logic block.

According to an embodiment, the invention concerns a software program for obtaining a plurality of difference images from an original image defined by a plurality of pixels, said software program causing a plurality of processors to: Calculate a plurality of difference images from an original image, by convolving each of a plurality of difference convolution functions, Dif, with said original image to obtain difference images, such that said plurality of processors calculates different difference images in parallel; wherein said plurality of difference convolution functions, Dif, have been established by calculating the difference between two blurring convolution functions, each of said two blurring convolution functions providing different degrees of blurring of said original image upon convolution of said original image.

According to an embodiment, the invention concerns a software program for identifying scale invariant features in an image defined by a plurality of pixels, said software program configured to: Implement a method according to the invention.

As part of the conventional SIFT algorithm, Difference of Gaussians (DoG) that occur at multiple scales are calculated. While other functions could in principle be applied, here the Gaussian function will be used for explanatory purposes.

In the SIFT algorithm, an input image is repeatedly blurred a fixed number of times, and the difference between successive blurred iterations is computed. One of the resulting images is then downsampled and the blurring/difference operation is repeated. The result is a collection of "Difference of Gaussian" images, several for each scale. The collection is called a difference of Gaussians pyramid, in this document called DoG pyramid.

According to an aspect of the invention, scaled images for all octaves in the Gaussian pyramid are produced and all DoG images in all scales in the pyramid are computed in parallel by convolving the scaled/downsampled images by a single DoG kernel each, where each DoG kernel is unique in its variance and amplitude. The resulting convolution process is equivalent to parallel filtering the scaled images at all scales by a number of 2D FIR filters corresponding to the number of DoG images needed. The coefficients of the FIR filters may be pre-calculated.

Pyramid methods that feature a linear time complexity in the number of pixels are well suited for real-time image processing and analysis including applications such as video compression, image Enhancement and reconstruction as well as image segmentation and feature measurement Some of the example functions used in these applications are:
Zooming with bi-quadratic B-spline filtering
Efficient image blurring of arbitrary blur width
Smooth interpolation with of scattered pixel data
Mipmap textures
Scale space construction for detecting gradient extremes Here, a method and system e.g. for the building of a Gaussian pyramid using parallel instantiations of an analysis filter consisting of combined Gaussian filtering and re-sampling kernels is presented. To illustrate the invention embodiments of a method and system for building a scale-space construction for detecting gradient extremes as suggested by the SIFT algorithm are presented.

A major phase in the computation of SIFT is scale-space construction. In this phase, Interesting image features or key points are detected using a cascade filtering approach that identifies image candidate locations. These image locations are evaluated and validated in further steps using different measures.

The first step is to identify image location coordinates and scales that can be repeatably assigned under pose variation of the object of interest.

Finding locations that are invariant to scale is performed by scale function that searches for stable features across different scales. The scale space convolution kernel of choice is the Gaussian function used to define the scale space function of an input image.

To detect stable keypoint locations in scale space, the difference of-Gaussian (DoG) function convolved with the image is D(x; y; σ) is computed from the difference of two nearby scales separated by a constant multiplicative factor k.

A DoG image D(x, y, σ) is given by:

$$D(x,y,\sigma)=L(x,y,k_i\sigma)-L(x,y,k_j\sigma),$$

where L(x, y, kσ) is the convolution of the original image I(x, y) with the Gaussian blur or kernel G(x, y, kσ) at a scale kσ, i.e., $$L(x,y,k\sigma)=G(x,y,k\sigma)*I(x,y).$$

The symbol "*" is used to indicate the convolution operation in x and y. The conventional SIFT algorithm thus calculates two convolutions, and subsequently the difference between these two convolutions.

According to an aspect of the present invention, the difference between two convolutions of an image may be calculated by convolving an image with a function, DiF, calculated as the difference between the two convolution functions as follows:

$$D(x,y,\sigma)=G(x,y,k_i\sigma)*I(x,y)-G(x,y,k_j\sigma)*I(x,y)$$

$$D(x,y,\sigma)=(G(x,y,k_i\sigma)-G(x,y,k_j\sigma))*I(x,y)$$

$$D(x,y,\sigma)=DiF(x,y,\sigma)*I(x,y),$$

wherein $$DiF(x,y,\sigma)=G(x,y,k_i\sigma)-G(x,y,k_j\sigma).$$

By using this substitution considerable increase of the speed is achieved, as two convolution operations and the subsequent calculation of the difference is replaced by a single convolution operation.

Upon use of the Gaussian kernel, $$G(x, y, \sigma) = \frac{1}{2\pi\sigma^2}e^{-(x^2+y^2)/2\sigma^2},$$

it may be shown that the convolution of two Gaussian kernels produces a third Gaussian kernel, with a variance which is the sum of the variances of the constituting Gaussians:

$$G(x, y, \sigma) * G\left(x, y, \frac{\sigma}{s}\right) = G\left(x, y, \sigma + \frac{\sigma}{s}\right).$$

Repeated convolutions may be substituted by one single convolution, obtained by convolving the convoluting functions.

Similarly, it may be shown that the DiF for two Gaussian kernels, where one of these is the double in width as the other can be calculated as:

$$DiF(x, y, \sigma) = G(x, y, 2\sigma) - G(x, y, \sigma) = \frac{1}{2\pi\sigma^2}e^{-\frac{x^2+y^2}{2\sigma^2}}\left(\frac{1}{2}e^{\frac{3(x^2+y^2)}{8\sigma^2}} - 1\right).$$

Generally, it can be shown that the DiF for two Gaussian kernels separated by a constant factor k can be calculated as:

$$DiF(x, y, \sigma) = G(x, y, k\sigma) - G(x, y, \sigma) = \frac{1}{2\pi\sigma^2} e^{-\frac{x^2+y^2}{2\sigma^2}} \left( \frac{1}{k} e^{\frac{(x^2+y^2)(k^2-1)}{2\sigma^2 \, k^2}} - 1 \right).$$

All cited references are incorporated by reference.

The accompanying Figures and Explanatory Note are provided to explain rather than limit the present invention. It will be clear to the person skilled in the art that aspects, embodiments and claims of the present invention may be combined.

FIGURES

The figures are introduced below and subsequently some figures are further explained.

Figure 7:
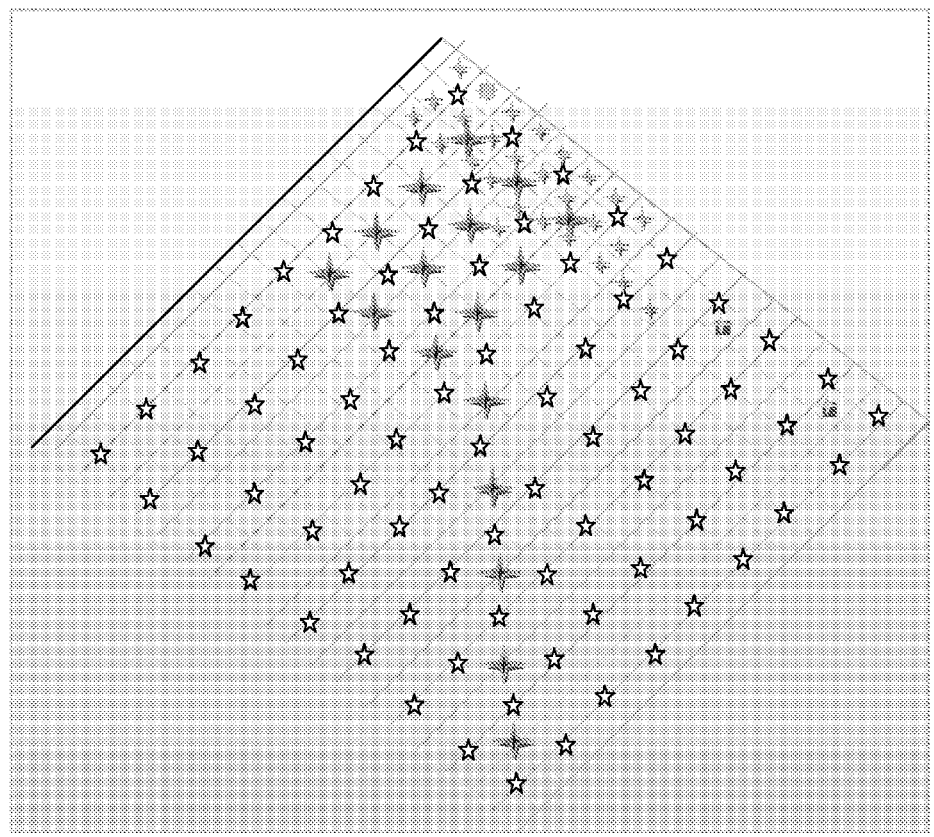

FIG. 7 outlines a scheme for an effective bilinear interpolator for the construction of a Gaussian pyramid according to an embodiment. This is a pyramid scheme based on bilinear texture interpolation.

Figure 8A:
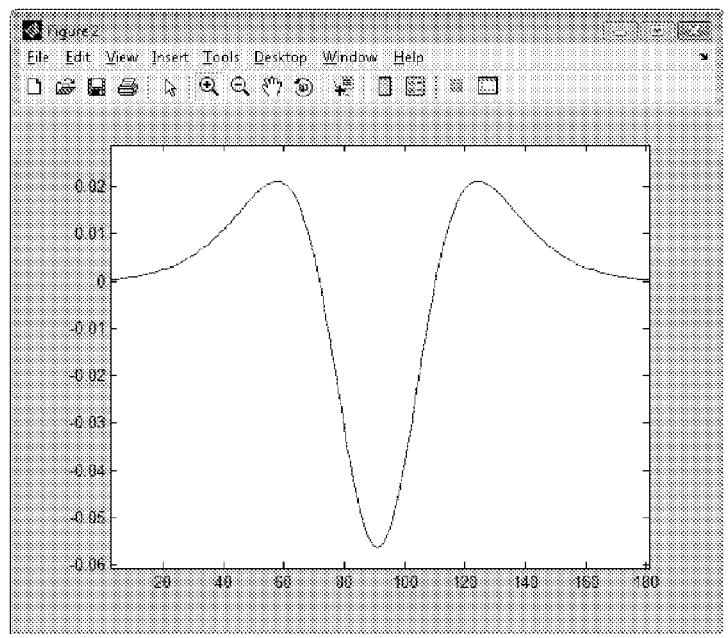
Figure 8B:
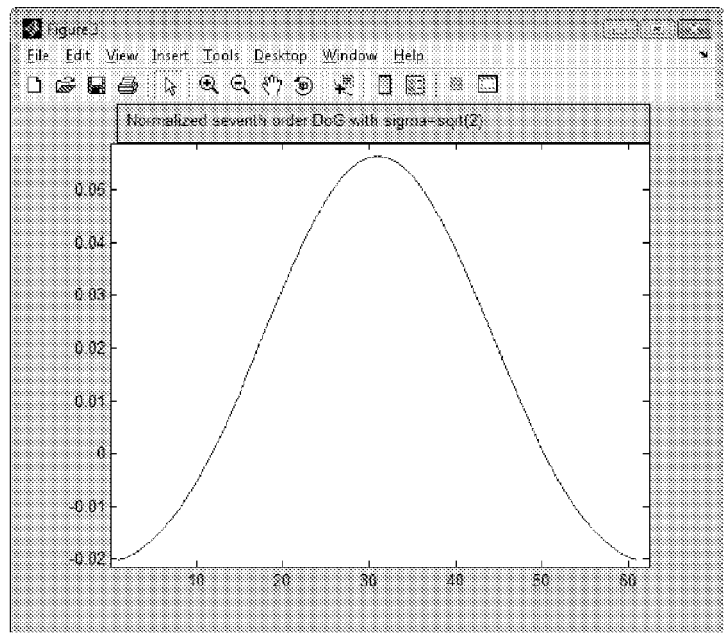

FIG. 8A shows a difference of Gaussian kernel (DiF), obtained by calculating the difference between two Gaussian functions with different widths, one of these depicted in FIG. 8B.

Figure 9:
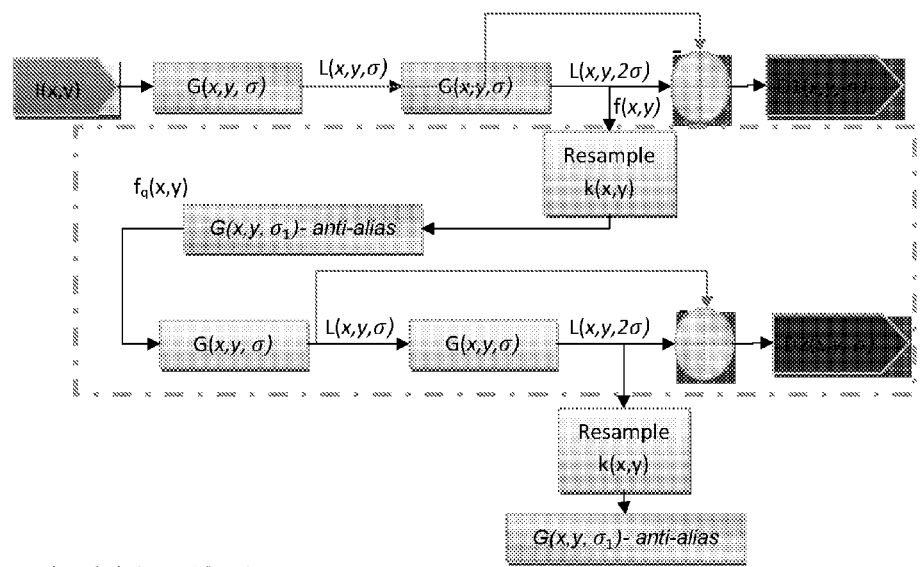

FIG. 9 shows a schematic block diagram for calculating DoG functions according to an embodiment.

Figure 10:
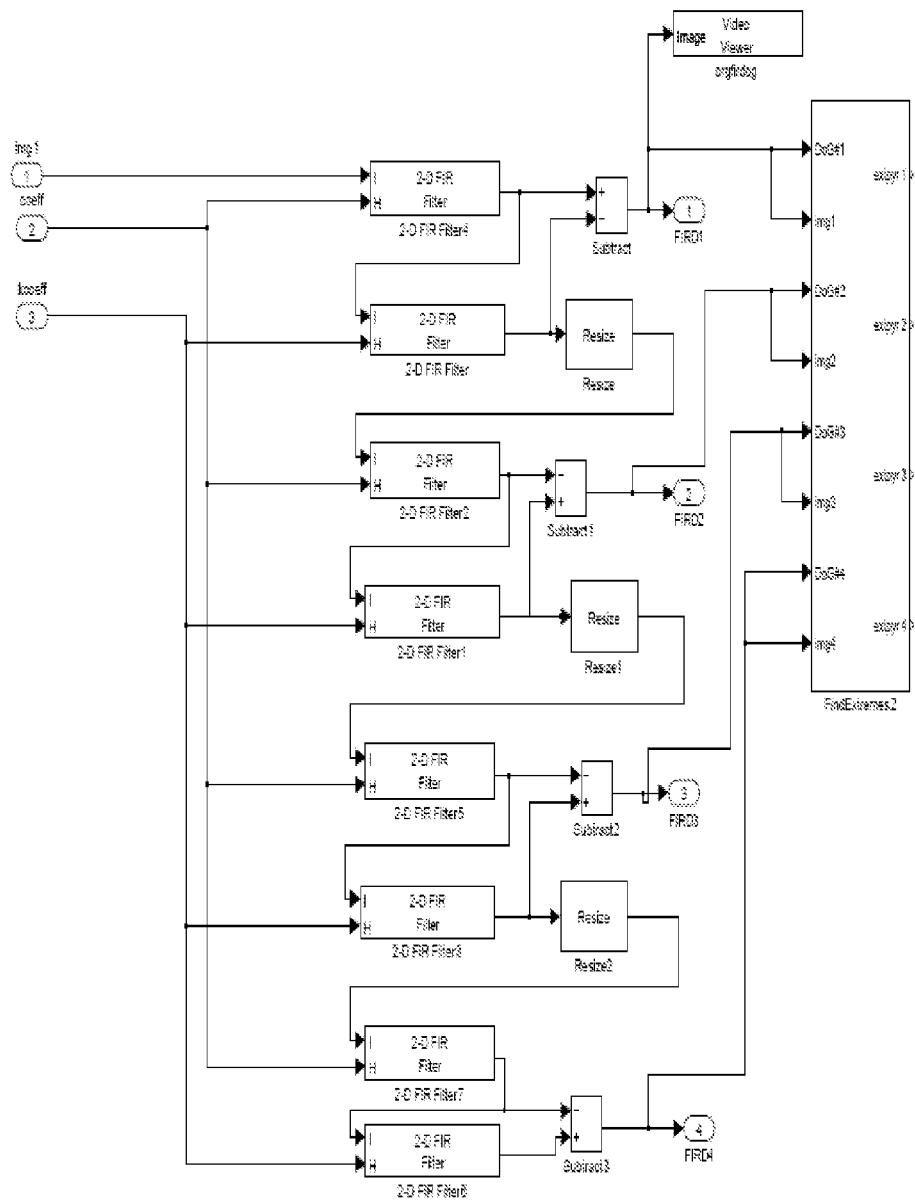

FIG. 10 shows a schematic diagram of part of a hardware implementation of an embodiment.

Figure 11:
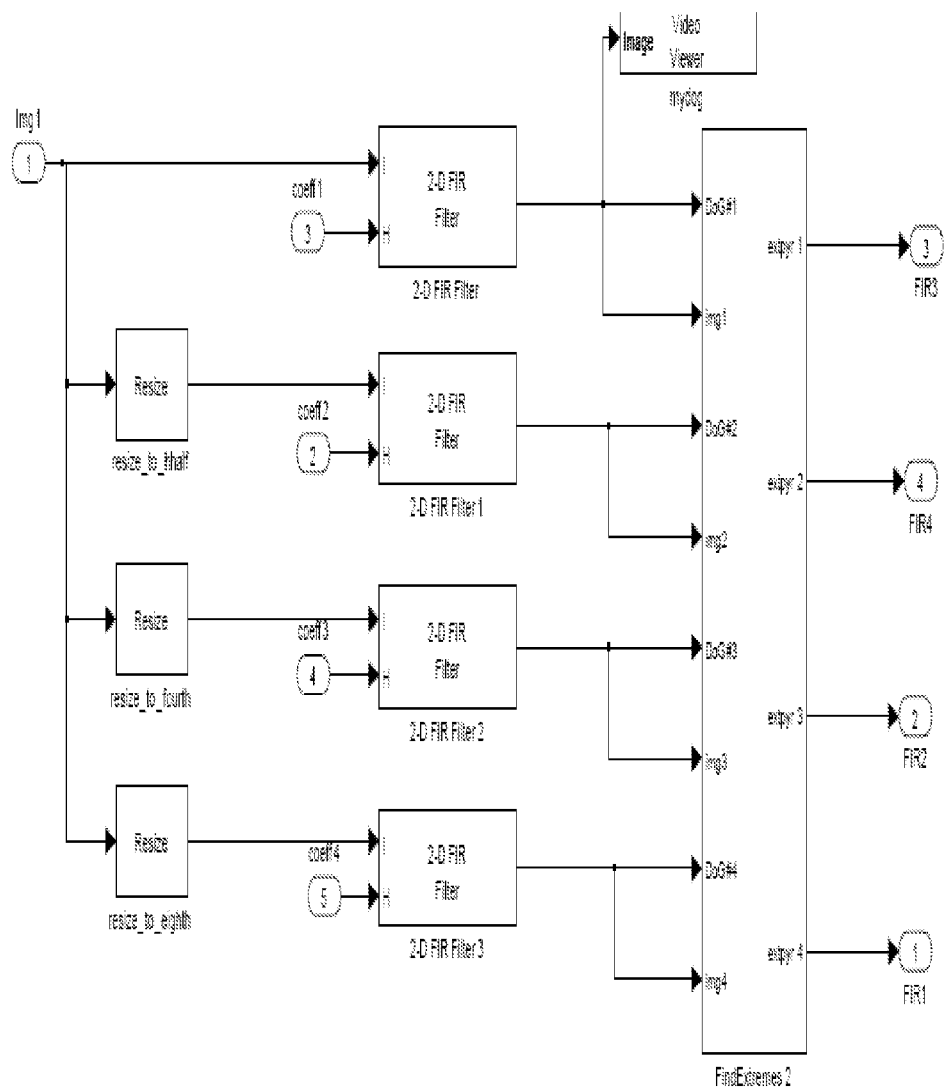

FIG. 11 shows a schematic diagram of part of a hardware implementation of an embodiment.

Figure 12:
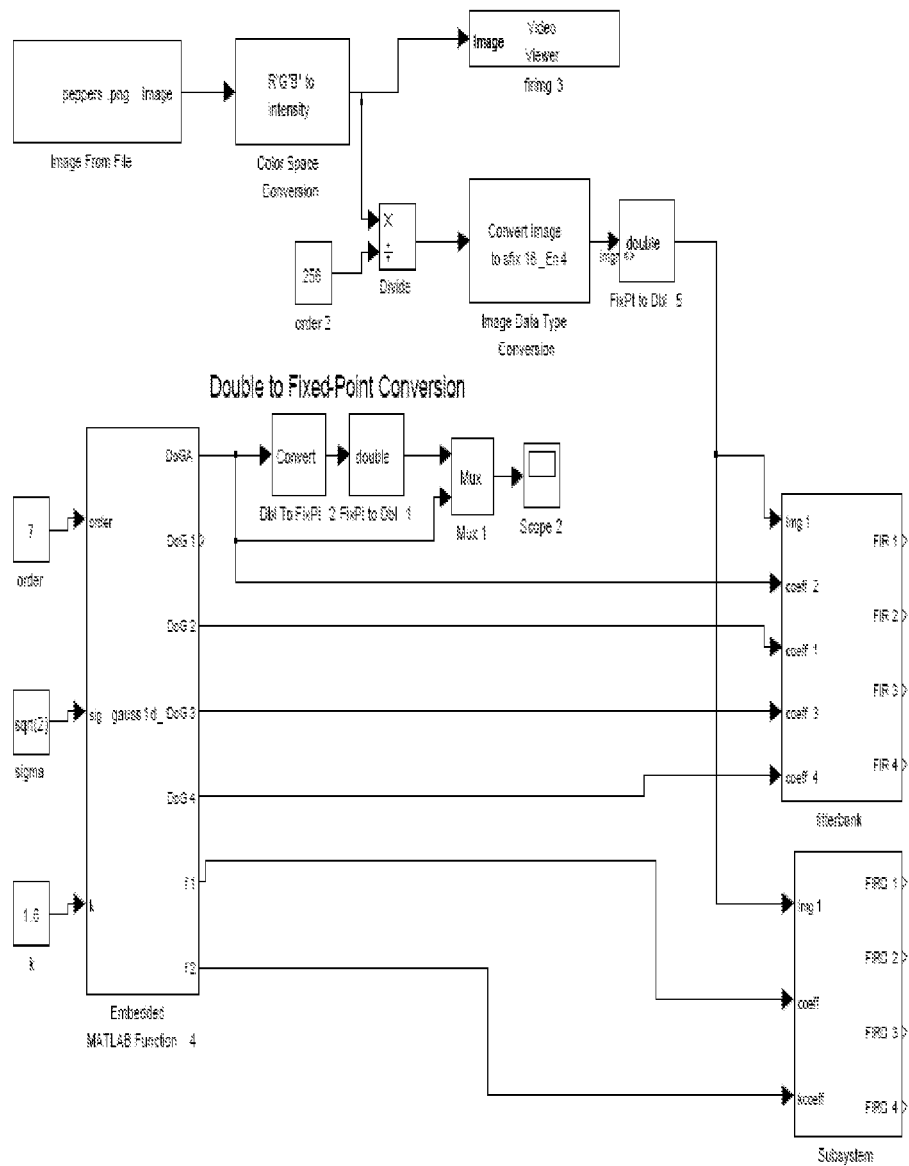

FIG. 12 shows a schematic diagram of part of a hardware implementation of an embodiment.

EXPLANATORY NOTE

Figure 1:
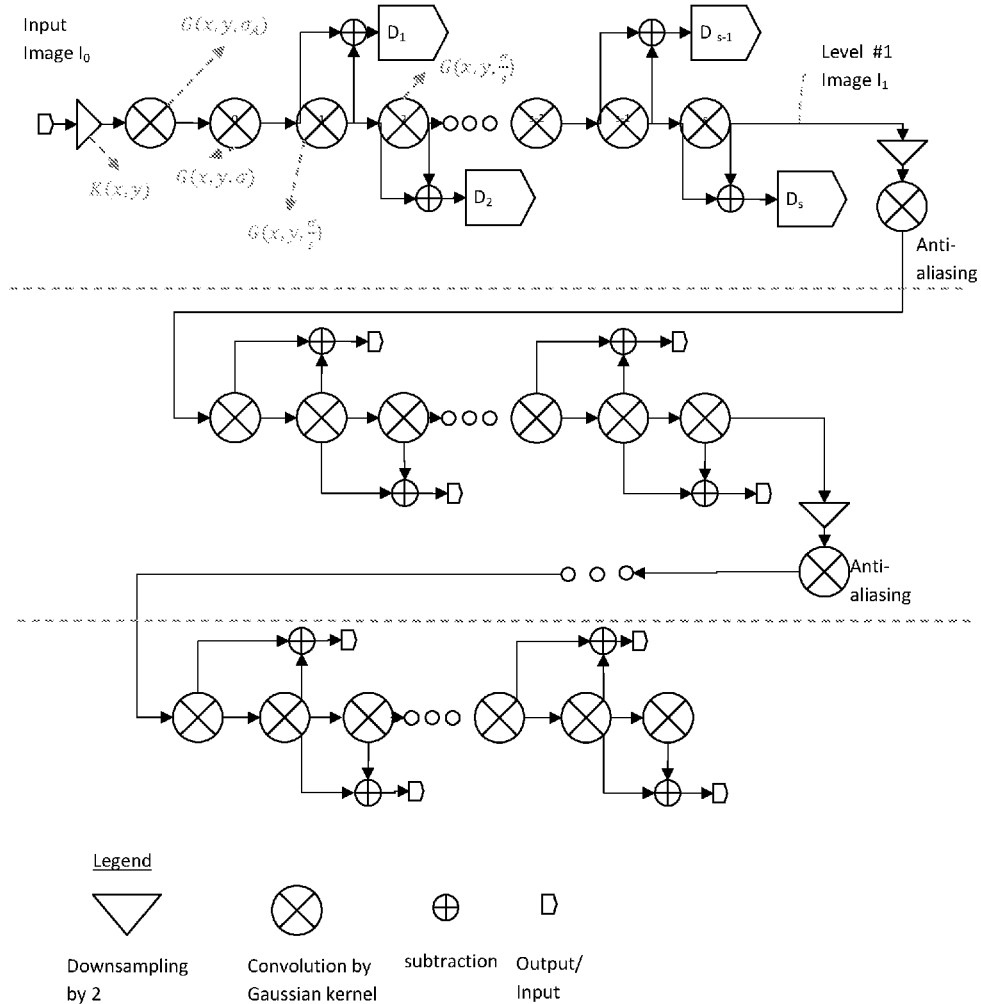
FIG. 1 shows an overview depicting a conventional method of building a Gaussian Pyramid using a cascading approach.

FIG. 1 illustrates a conventional method of constructing the DoG function by example.

Following the cascade property of Gaussian kernels, the convolution of two Gaussian kernels produces a third Gaussian kernel. As noted above, when we convolve two Gaussian kernels we get a new wider Gaussian with a variance $\sigma^2$ which is the sum of the variances of the constituting Gaussians. The symbol "$\otimes$" is used to denote convolution.

It follows that the difference of Gaussian images at the subtractor outputs at each level in FIG. 1 can be expressed as:

$$D_{n,m} = \left[ G\left(x, y, \sigma + n\frac{\sigma}{s}\right) - G\left(x, y, \sigma + (n-1)\frac{\sigma}{s}\right) \right] \otimes \qquad (1)$$
$$I_{m-1}(x, y) \otimes K(x, y) \otimes G(x, y, \sigma_A),$$

where n=1 to s; and m runs from 1 to the number of pyramid levels.

It also follows that the input image of each level can be expressed as:

$$I_m(x,y) = I_{m-1}(x,y) \otimes G(x,y, 2\sigma + \sigma_A) \otimes K(x,y) \qquad (2)$$

Where m≥1; Hence FIG. 1 can be redrawn as in FIG. 2, allowing for entire parallel computation of the DoG Pyramid.

Figure 2:
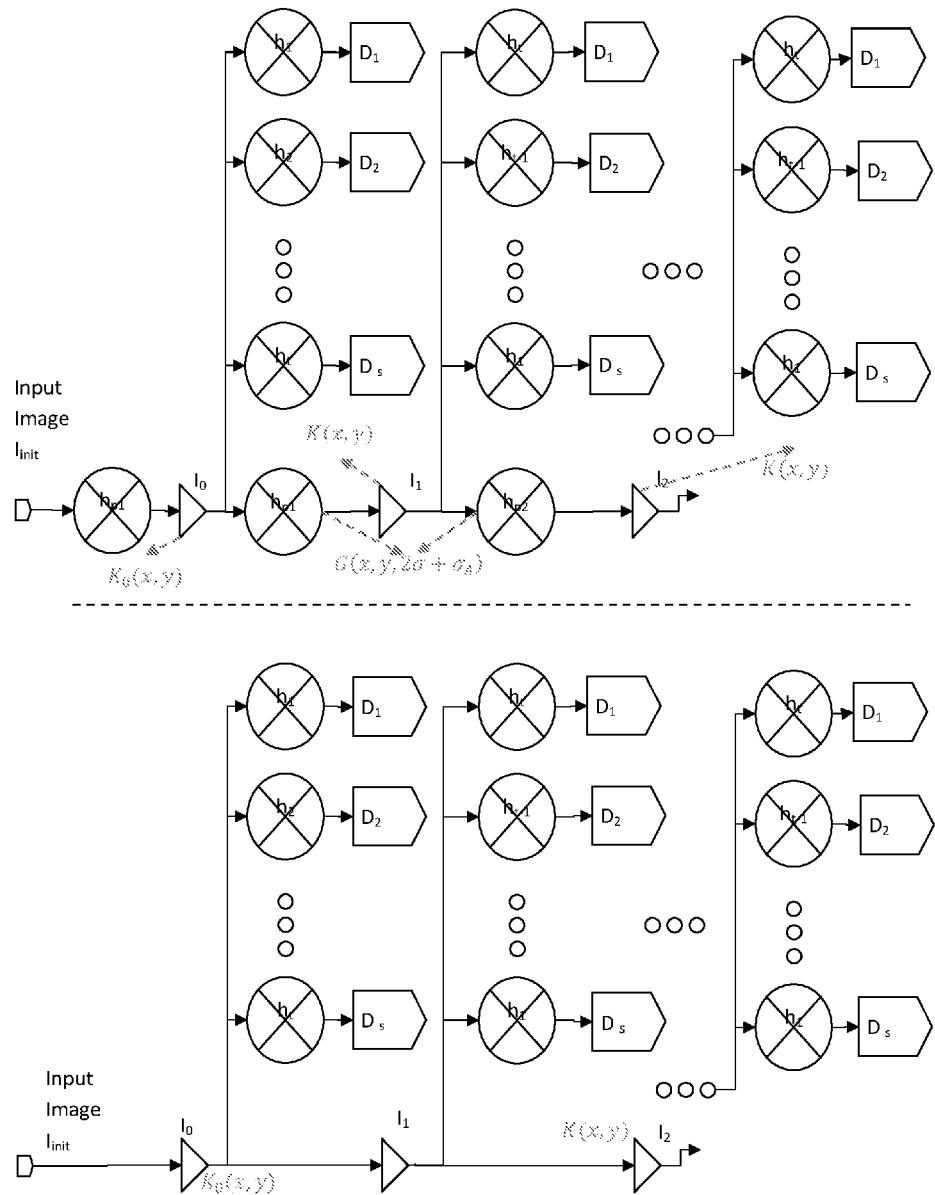
FIG. 2 shows a schematic overview depicting two different DoG pyramid methods according to two embodiments suitable for parallel hardware implementation.

Referring to FIG. 2, the combination of the re-sampling kernel and the path Gaussian kernel denoted $hp_m$ can be considered as an analysis filter, where an image is first convolved by an interpolation kernel k(x,y) and then convolved by the convolution kernel $G(x, y, 2\sigma + \sigma_A)$ that includes anti-alias filtering.

It follows that the analysis filter of combined interpolation kernel and $G(x,y,2\sigma + \sigma_A)$ can be represented by a single convolution kernel as:

$$q(x, y) = G(x, y, 2\sigma + \sigma_A) \otimes K(x, y) = \sum_{x_2, y_2} G(x_2, y_2) K(x - x_2, y - y_2)$$

Hence equation (2) can be rewritten as (see proof below in appendix A):

$$I_n(x, y) = I_{n-1}(x, y) \otimes q(x, y) = \sum_{x_1, y_1} I_{n-1}(x_1, y_1) q(x - x_1, y - y_1)$$

Or as:

$$I_n(x, y) = \sum_{x_1, y_1} I_{n-1}(x_1, y_1) \sum_{x_2, y_2} G(x_2, y_2, 2\sigma + \sigma_A) K(x - x_2 - x_1, y - y_2 - y_1)$$

Or as:

$$I_n(x, y) = \sum_{x_1, y_1, x_2, y_2} I_{n-1}(x_1, y_1) G(x_2, y_2, 2\sigma + \sigma_A) K(x - x_2 - x_1, y - y_2 - y_1)$$

In general, the re-sampling function represented by K(x,y) can be considered as a Delta-Dirac function $\delta(x)$. Which is one of the generalized mathematical functions that can be represented by the Gaussian function, when we take the limit as the inner scale goes down to zero. Hence:

$$\lim_{\sigma \to 0} \left( \frac{1}{\sqrt{2\pi}\,\sigma} e^{-\frac{x^2}{2\sigma^2}} \right) = \delta(x).$$

It then follows that any sampling function can be treated as a Gaussian kernel and thus the cascade property can be applied.

In a particular case where the re-sampling function is an interpolation by convolution (Convolution Interpolation is a common method used to resample data between arbitrary Grids) then the analysis filter can be described by one Gaussian kernel as $$h(x,y,\sigma_k+2\sigma)=G(x,y,2\sigma) \otimes K(x,y,\sigma_k)$$

In another particular case where the re-sampling involves a down-sampling function, a particular notation can for convenience be introduced for the combination of an analysis filter with a reduction by a factor of $2^m$ in each dimension:

$$f = h \otimes \downarrow^m g,$$

Where g represents the input image and f is the resulting image with components:

$$f_{r,c} = \sum_{i=1}^{n_i} \sum_{j=1}^{n_j} h_{i,j} g_{2^m r - \lfloor i - n_i/2 \rfloor, 2^m c - \lfloor j - n_j/2 \rfloor}.$$

Where the filter mask h is represented by an $n_i \times n_j$ matrix and the image g is of dimensions $n_r \times n_c$, the matrix component $f_{r,c}$ for the row index r and the column index c.

In the specific case where, the down-sampling kernel is a bilinear interpolator, the analysis Bilinear interpolator works by the weighted averaging of 4 neighboring pixels in a 2×2 kernel at one scale (s) to produce a single pixel in a coarser scale according to the following equation:

$$P_{new} = \frac{p(i,j) + P(i,j+1) + P(i+1,j) + P(i+1,j+1)}{4}$$

Where the neighboring pixels are represented by p(x,y).

$$s_{2 \times 2} = \begin{vmatrix} i, j & i+1, j \\ i, j+1 & i+1, j+1 \end{vmatrix}$$

Figure 3:
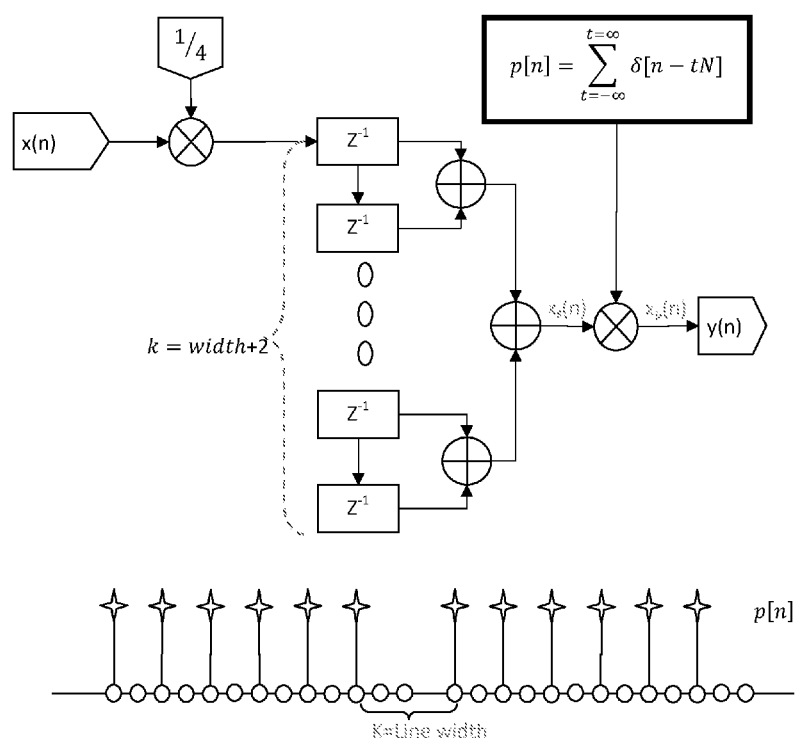
FIG. 3 shows a schematic overview depicting a block diagram of a bilinear down-sample interpolator according to an embodiment.

A block diagram of such an interpolator is shown in FIG. 3. The Linear time-invariant discrete time system shown in the figure can be represented as:

$$y(n) = x_s[n]p[n]$$

$$= \sum_{t=-\infty}^{t=\infty} x_s[tN]\delta[n-tN]$$

$$= \left[\frac{1}{4}x(n) + \frac{1}{4}x(n-1) + \frac{1}{4}x(n-k+1) + \frac{1}{4}x(n-k)\right] \cdot$$

$$\sum_{t=-\infty}^{t=\infty} \delta[n-tN]$$

Where, k is the line width of the input image, t is an integer and N is the sampling period. Thus $$y[n] = \begin{cases} x_s[n] & \text{if } n = \text{an integer multiple of } N \\ 0, & \text{otherwise} \end{cases}$$

Figure 4:
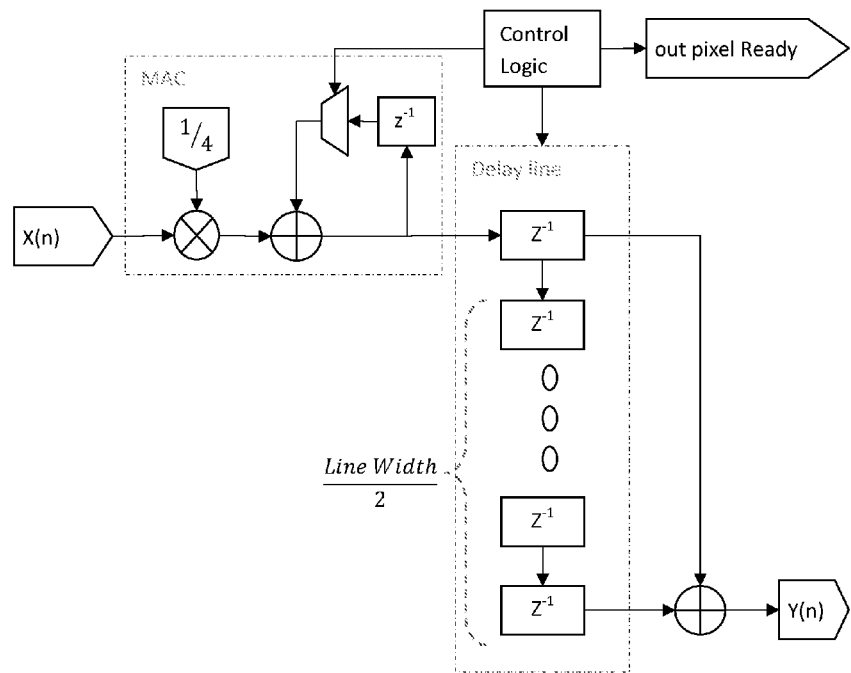
FIG. 4 shows a schematic overview depicting a block diagram of a hardware effective implementation of a bilinear down-sample interpolator according to an embodiment.
Figure 5:
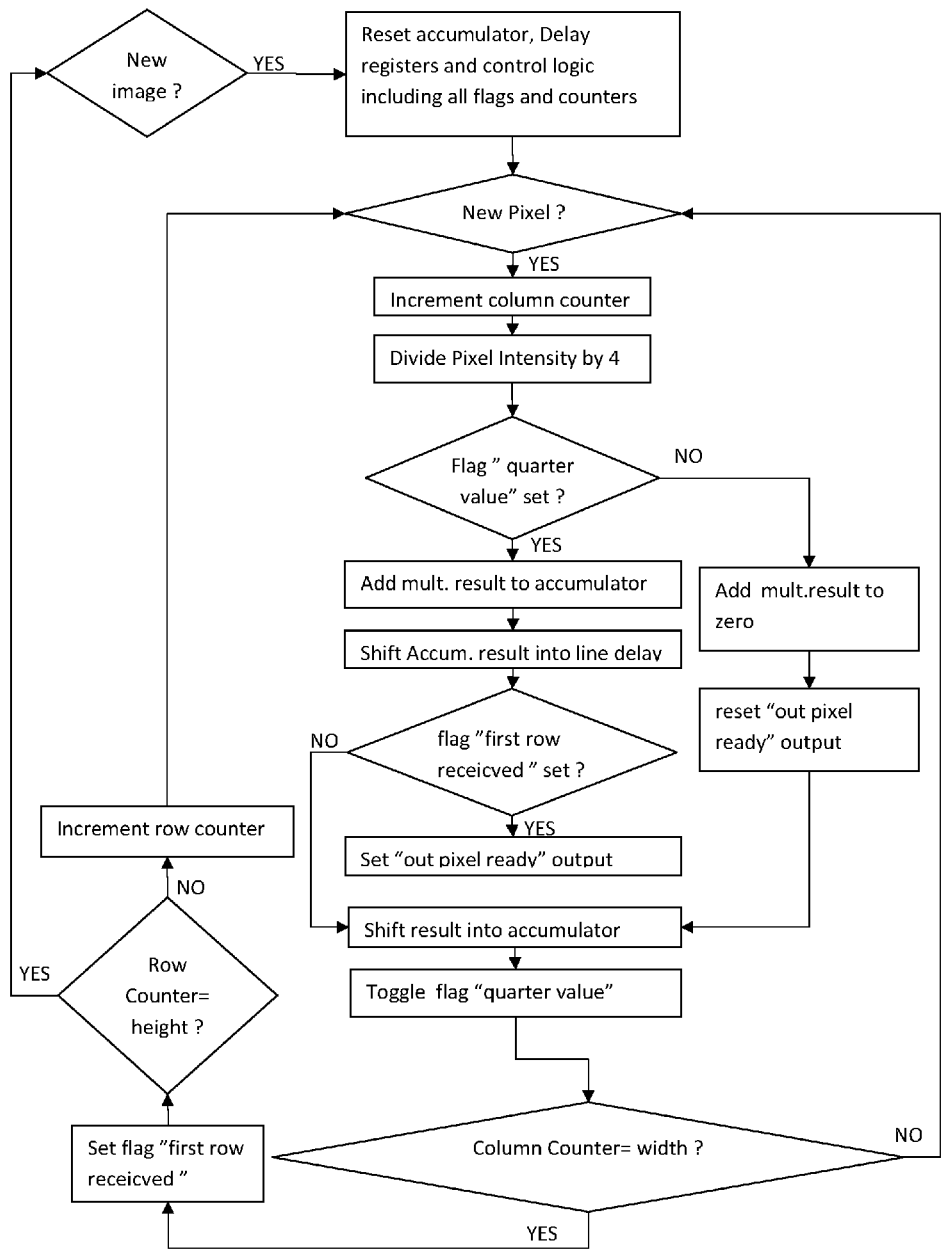
FIG. 5 shows a schematic flow chart depicting a down-sample interpolator according to an embodiment.
Figure 6:
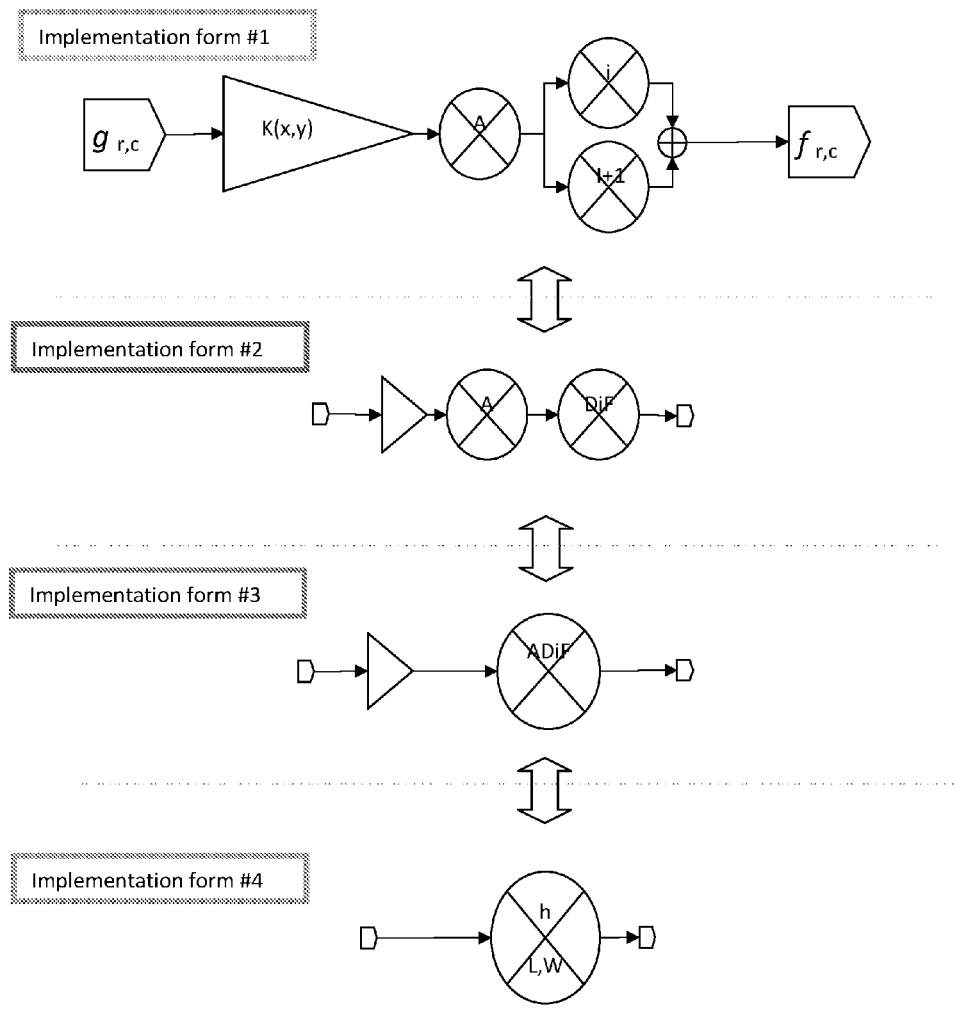
FIG. 6 shows a schematic diagram indicating how basic building blocks for a Gaussian pyramid may be combined for efficient hardware performance according to embodiments of the invention.

FIG. 4 shows a block diagram for a hardware implementation of an effective bilinear interpolator. The interpolator consists of a multiply and accumulate unit (MAC), a delay line an adder and a control logic block. The Interpolator is configurable with respect to image size in terms of number of pixels per line and number of lines in the image at the actual pyramid level. The down-sample interpolator functions are outlined in the flow diagram in FIG. 5, showing the control logic in the down-sample interpolator.

Appendix A

Interpolation and Convolution in a Single Operation

If we want to resample an image f(x,y) by an interpolation kernel k(x,y) and then convolve it by a convolution kernel p(x,y), we can save a step by convolving by a kernel, q(x,y), which is the convolution of p(x,y) by k(x,y):

$$q(x,y) = \sum_{x_2, y_2} p(x_2, y_2) k(x - x_2, y - y_2)$$

If we interpolate using a kernel q(x,y) to get $f_q(x,y)$:

$$f_q(x,y) = \sum_{x_2, y_2} f(x_1, y_1) q(x - x_1, y - y_1)$$

Plugging in our definition of q(x,y):

$$f_q(x,y) = \sum_{x_1, y_1} f(x_1, y_1) \sum_{x_2, y_2} p(x_2, y_2) k(x - x_1 - x_2, y - y_1 - y_2)$$

Regrouping the summation, we arrive at our final sum:

$$f_q(x,y) = \sum_{x_1, y_1, x_2, y_2} f(x_1, y_1) p(x_2, y_2) k(x - x_1 - x_2, y - y_1 - y_2)$$

To prove this, define $f_i(x,y)$ to be the image after interpolation but before convolution:

$$f_i(x,y) = \sum_{x_1, y_1} f(x_1, y_1) k(x - x_1, y - y_1)$$

Then, convolve it by p(x,y) to get the final result, $f_p(x,y)$:

$$f_p(x,y) = \sum_{x_2, y_2} p(x_2, y_2) f_i(x - x_2, y - y_2)$$

Plugging in our value for $f_i(x,y)$, we get $$f_p(x,y) = \sum_{x_2, y_2} p(x_2, y_2) \sum_{x_1, y_1} f(x_1, y_1) k(x - x_1 - x_2, y - y_1 - y_2)$$

Regrouping the sums, we get the same thing we got by interpolating by q(x,y):

$$f_p(x, y) = \sum_{x_1, y_1, x_2, y_2} f(x_1, y_1)p(x_2, y_2)k(x - x_1 - x_2, y - y_1 - y_2)$$

Note that if the interpolation kernel is a sinc function which samples a wider frequency range than the convolution kernel, then all we need to do is interpolate using our convolution kernel.)

$$q(x,y) = p(x,y) * k(x,y) \Rightarrow \mathcal{F}(q(x,y)) = P(u,v)K(u,v)$$

Because the Fourier transform of a sinc function is a square:

$$\mathcal{F}(\text{sinc}(x)) = \Pi \quad (8)$$

where $\Pi(s) = 1$ if $|s| 1/2$ and 0 otherwise, $$P(u,v)K(u,v) = P(u,v)$$

if $K(u,v)$ has a scale such that $P(u,v)$ is 0 whenever $K(u,v)$ is. In other words, $Q(u,v) = P(u,v)$ whenever $P(u,v)$ is band limited with a band smaller than the band limit of the interpolating sinc function, $K(u,v)$.

The invention claimed is:

1. A method configured for parallel computation for obtaining a first plurality of difference images and a number, n, of subsequent plurality of difference images, said method comprising:
   a. Obtaining a first plurality of difference images from an original image defined by a plurality of pixels, the first plurality of difference images obtained by:
      i. Providing a plurality of blurring convolution functions, each of said blurring functions providing increasing degree of blurring of said original image upon convolution of said original image;
      ii. Establishing a plurality of difference convolution functions, Dif, by calculating a difference between any two of said blurring convolution functions, each of said two blurring convolution functions providing different degrees of blurring of said original image upon convolution of said original image; and
      iii. Calculating a plurality of difference images from said original image, by convolving each of said difference convolution functions, Dif, with said original image to obtain difference images,
   b. Obtaining a first down sampling anti-aliasing convolution function, DAcon(1), by convolving said plurality of blurring functions with a down sampling function and an anti-aliasing function;
   c. When n is larger than 1, obtaining additional down sampling anti-aliasing convolution function(s), DAcon (t), by convolving the previous down sampling antialiasing convolution function, DAcon(t-1), with said plurality of blurring functions, a down sampling function and an anti-aliasing function, beginning this step c with t =2, and repeating this step while increasing t with unitary increments until t reaches n;
   d. Convolving all of the down sampling anti-aliasing convolution functions, DAcon, with said original image to obtain an image(x) for each down sampling antialiasing convolution function DAcon(x);
   e. Obtaining the n subsequent pluralities of difference images, obtaining each plurality(x) from each image(x), wherein said blurring convolution functions are Gaussian.

2. The method according to claim 1, for use in a method of identifying scale invariant features in said original image.

3. The method according to claim 1, wherein said plurality of difference blurring convolution functions are established once and repeatedly used for subsequent calculation of said difference images.

4. The method according to claim 1, wherein said difference convolution function, Dif, is approximated by a polynomial.

5. The method according to claim 2, wherein the method of identifying scale invariant features in said original image, wherein the identified image features are stable across different scales in an image defined by a plurality of pixels, wherein multiple filtering steps and re-sampling steps may be performed in parallel, the method comprising:
   a. Obtaining said multiple difference images;
   b. Locating pixel amplitude extrema in said multiple difference images; c. Producing a pixel gradient vector for each pixel in each difference image;
   d. Associating vector orientations with respective actual maximal and minimal amplitude pixels associated with each difference image.

6. An image processing device configured for parallel computation for obtaining a plurality of difference images from an original image defined by a plurality of pixels, said device comprising means for receiving data in respect of said first image, means for transmitting or storing said difference images, and
   a processor circuit, configured to:
   a. Obtain said a first plurality of difference images from said original, the first plurality of difference images obtained by:
   i. Provide a plurality of blurring convolution functions, each of said blurring functions providing increasing degree of blurring of said original image upon convolution of said original image;
   ii. Establish a plurality of difference convolution functions, Dif, by calculating a difference between any two of said blurring convolution functions, each of said two blurring convolution functions providing different degrees of blurring of said original image upon convolution of said original image; and
   iii. Calculate a plurality of difference images from said original image, by convolving each of said difference convolution functions, Dif, with said original image to obtain difference images;
   b. Obtain a first down sampling anti-aliasing convolution function, DAcon(1), by convolving said plurality of blurring functions with a down sampling function and an anti-aliasing function;
   c. When n is larger than 1, obtaining additional down sampling anti-aliasing convolution function(s), DAcon (t), by convolving the previous down sampling antialiasing convolution function, DAcon(t-1), with said plurality of blurring functions, a down sampling function and an anti-aliasing function, beginning this step c with t =2, and repeating this step while increasing t with unitary increments until t reaches n;
   d. Convolve all of the down sampling anti-aliasing convolution functions, DAcon, with said original image to obtain an image(x) for each down sampling antialiasing convolution function DAcon(x);
   e. Obtain the n subsequent pluralities of difference images, obtaining each plurality(x) from each image(x), wherein said blurring convolution functions are Gaussian.

7. The image processing device according to claim 6, wherein said processor circuit comprises a chip, such as a CPU.

8. The image processing device according to claim 6, said image processing device comprising multiple chips, each chip configured to calculate at least one difference image.

9. The image processing device according to claim 6, wherein said image processing device comprises a bilinear interpolator, said bilinear interpolator comprising a multiply and accumulate unit (MAC), a delay line adder and a control logic block.

10. A computer program product comprising program code means stored on a non-transitory computer readable medium for performing the method of claim 1 when said program product is run on a computer.

\* \* \* \* \*